United States Patent
Condolf et al.

(10) Patent No.: US 9,206,070 B2
(45) Date of Patent: Dec. 8, 2015

(54) DEVICE DELIVERING GLASS FIBRES WITH A REDUCED PRECIOUS METAL CONTENT

(71) Applicant: SAINT-GOBAIN ADFORS, Chambery (FR)

(72) Inventors: Cyril Condolf, Saint-Germain-En-Laye (FR); Achim Breuer, Aachen (DE)

(73) Assignee: SAINT-GOBAIN ADFORS, Chambery (FR)

( * ) Notice: Subject to any disclaimer, the term of this patent is extended or adjusted under 35 U.S.C. 154(b) by 0 days.

(21) Appl. No.: 14/349,787

(22) PCT Filed: Oct. 2, 2012

(86) PCT No.: PCT/FR2012/052229
§ 371 (c)(1),
(2) Date: Apr. 4, 2014

(87) PCT Pub. No.: WO2013/050696
PCT Pub. Date: Apr. 11, 2013

(65) Prior Publication Data
US 2014/0260434 A1     Sep. 18, 2014

(30) Foreign Application Priority Data
Oct. 6, 2011  (FR) ...................................... 11 59017

(51) Int. Cl.
*C03B 37/095*  (2006.01)
*C03B 37/08*   (2006.01)

(52) U.S. Cl.
CPC ........... *C03B 37/095* (2013.01); *C03B 37/0805* (2013.01); *Y10T 29/49885* (2015.01)

(58) Field of Classification Search
USPC ......................... 65/493; 29/458; 247/576, 454
IPC ............................................ C03B 37/095,37/08
See application file for complete search history.

(56) References Cited

U.S. PATENT DOCUMENTS 2,931,062 A      4/1960  Leaman
3,248,190 A  *   4/1966  Woodward et al. ............. 65/493
(Continued)

FOREIGN PATENT DOCUMENTS

DE   1 196 823    7/1965
EP   2 000 442    12/2008
WO   98 50313     11/1998

OTHER PUBLICATIONS

International Search Report Issued Nov. 14, 2012 in PCT/FR12/052229 Filed Oct. 2, 2012.

*Primary Examiner* — Mark Halpern
(74) *Attorney, Agent, or Firm* — Oblon, McClelland, Maier & Neustadt, L.L.P.

(57) ABSTRACT

The invention relates to a device delivering filaments of molten material, especially glass, by Joule heating using a power supply, comprising side plates, a bottom plate provided with nozzles for the flow of the molten material and optionally an upper screen, is characterized in that at least one of these parts capable of being in contact with the molten material is formed by:
 a solid part made of iron-based alloy having a melting point above 1450° C. that forms a substrate,
 a metal tie layer formed on at least one portion of the surface of the substrate,
 a ceramic layer covering the metal tie layer, the metal layer and the ceramic layer forming a diffusion barrier to the components of the alloy that forms the substrate, and
 a protective coating layer made of platinum or platinum alloy, deposited directly on the ceramic layer.

20 Claims, 1 Drawing Sheet

(56) References Cited

U.S. PATENT DOCUMENTS

| | | | |
|---|---|---|---|
| 4,140,507 A * | 2/1979 | Costin et al. | 65/475 |
| 4,957,525 A * | 9/1990 | Gaertner et al. | 65/493 |
| 5,385,595 A * | 1/1995 | McGarry | 65/515 |
| 5,417,735 A * | 5/1995 | McGarry | 65/492 |
| 5,914,439 A | 6/1999 | McGarry | |
| 6,810,693 B1 * | 11/2004 | Hartman et al. | 65/495 |
| 2007/0178329 A1 * | 8/2007 | Trommer et al. | 428/586 |

\* cited by examiner

DEVICE DELIVERING GLASS FIBRES WITH A REDUCED PRECIOUS METAL CONTENT

This Application is a 371 of PCT/FR2012/052229 filed 2 Oct. 2012.

The invention relates to a fiberizing installation delivering fibers and more particularly to a device delivering filaments of molten material, especially glass, and to the process for manufacturing this device.

Conventionally, a fiberizing installation comprises a glass flow block, which receives molten glass coming from a feeder connected to the furnace in which the glass is melted, a bushing block and a device delivering filaments of molten material: bushings or drain bushings. The upper part of the device may comprise a screen which makes it possible to distribute the flow of glass coming from the bushing block and to heat the glass by Joule heating. The device is heated using an electrical transformer by the connection of two terminals, each located on opposite ends of the device, to electrical connection components external to the device. The terminals are attached by welding them to the side walls of the bushing and they project so as to be connected to the external connection components which are in the form of a jaw clamp made of electrically conductive material. The bottom of the device is equipped with a plate provided with holes, or nozzles, through which the molten glass flows, to be drawn into a multiplicity of filaments.

These filaments, the diameter of which may generally vary from 5 to 33 μm, are collected into at least one sheet that converges on an assembling device in order to form at least one strand and, for example, to be wound up. Depending on its use, the strand may also be chopped (to form chopped strands) or thrown onto a belt (to form continuous strand mats). The products obtained are used mainly in various reinforcing applications.

The bushings or drain bushings are subjected to a corrosive environment imposed by the molten glass and the high temperatures of the operation thereof. These devices are conventionally manufactured from precious metals, and usually from platinum or platinum alloys, such as for example, non-limitingly, from PtRh, PtAu or PtIr alloy, electrically conductive materials that are resistant, over time, to very high temperatures. However, these materials are very expensive and it appears economically desirable to limit the amount of precious metal necessary in the fiberizing installations. It is within this context that the present invention, which proposes a solution that makes it possible to reduce the amount of precious metals in devices such as bushings or drain bushings, falls.

Document US 2007/0178329 describes a crucible made of molybdenum or made of tungsten comprising a protective coating based on an alloy of tungsten and of a metal selected from iridium, rhenium, osmium and ruthenium. However, metals such as molybdenum or tungsten cannot be used for devices delivering glass fibers, due to their low oxidation resistance. In fiberizing processes, the external parts of the devices are exposed to the air at temperatures of the order of 1100 to 1400° C. and are therefore subjected to significant oxidation phenomena. Moreover, metals such as rhenium, osmium or ruthenium are rare and expensive metals and are difficult to use in the desired applications.

Patent application WO 99/00336 describes a pierced fiberizing spinner, the orifices of which are covered with an alloy based on cobalt and chromium for the purpose of limiting corrosion. U.S. Pat. No. 5,417,735 proposes to place alternating layers of chromium and nickel on the orifices of spinners in order to form a corrosion-resistant coating. According to these documents, the coatings are deposited directly on the metal substrate. However, for high-temperature applications, diffusion problems are encountered and result in brittle porous structures at the interface. Furthermore, a chromium-based coating is not desirable since this metal risks being converted into hexavalent chromium at these temperatures.

Johnson, in the journal Glass, September 1972, page 372, "Platinum coating technique developed for glass industry", proposes a process for applying a corrosion-resistant platinum-based coating that is deposited at the surface of the orifices of fiberizing spinners. As indicated in documents WO 98/50313 and U.S. Pat. No. 5,385,595, a harmful diffusion zone is then formed at the interface between the metal alloy of the substrate generally based on chromium, nickel and cobalt and the layer of platinum. The formation of a diffusion barrier based on borides, carbides or nitrides is described. The main drawback of these solutions lies in the fact that the superalloys based on cobalt or nickel that are used for the fiberizing spinners melt at temperatures below 1400° C. and consequently cannot be used for devices such as bushings or drain bushings.

The present invention proposes devices delivering glass filaments that are manufactured, at least partly, from a more economical material than the precious metals used to date and that have a good oxidation resistance, a good corrosion resistance in contact with the molten glass and a good wettability by the glass. The material must also be a good electrical and heat conductor, the bushings or drain bushings being heated by Joule heating.

According to the invention, the device delivering filaments of molten material, especially glass, by Joule heating using a power supply, comprising side plates, a bottom plate provided with nozzles for the flow of the molten material and optionally an upper screen, is characterized in that at least one of these parts capable of being in contact with the molten material is formed by:
  a solid part made of iron-based alloy having a melting point above 1450° C. that forms a substrate,
  a metal tie layer formed on at least one portion of the surface of the substrate,
  a ceramic layer covering the metal tie layer, the metal layer and the ceramic layer forming a diffusion barrier to the components of the alloy that forms the substrate, and
  a protective coating layer made of platinum or platinum alloy, deposited directly on the ceramic layer.

According to the invention, it is conceivable that the substrate made of iron alloy is uniquely formed by the side plates alone or a portion of these plates. The upper screen, if it is present, may also be made of iron alloy and may thus form the substrate. The bottom plate provided with nozzles may be manufactured from iron alloy and the nozzles, enabling the flow of the molten material, may be made of platinum or platinum alloy.

It is also possible to envisage that the bottom plate and the nozzles are made of platinum or platinum alloy. In this case, the substrate corresponds to the side plates and to the upper screen optionally present.

Preferably, the metal, ceramic and protective coating layers cover all the faces of the substrate capable of coming into contact with the molten material.

The parts of the device capable of being in contact with the molten material must, if they are not made of iron alloy, either comprise a coating made of platinum or platinum alloy, or be manufactured from a precious metal or from any other alloy or metal capable of withstanding corrosion in contact with the molten material if the temperatures of the zones of the device in question are compatible with the use of said alloy or metal.

As an alloy or metal of this type, mention may be made for example of palladium, alloys of FeCrNi type, or superalloys based on cobalt or nickel.

The zones of the device that are at temperatures above 1200° C. are advantageously made of iron-based alloy covered with metal, ceramic and protective coating layers.

Preferably, the substrate is made of FeCrAl alloy. The metals iron, chromium and aluminum are the major constituents of these alloys.

The FeCrAl alloy may comprise, in percentages by weight, between 15% and 25% of chromium, between 4.5% and 6.5% of aluminum, and optionally at least one element selected from carbon, nickel, silicon, manganese, titanium, tungsten, yttrium, tantalum, zirconium, lanthanum, cerium and hafnium, preferably at contents of at most 1% by weight of each of these elements, the remainder being iron.

The FeCrAl alloy may also comprise, in addition, between 2% and 4% by weight of molybdenum.

The diffusion barrier layer comprises at least two layers, a first layer being a metal tie layer, the second layer being a ceramic layer. Preferably, the ceramic layer is made of zirconia stabilized with yttrium oxide and/or with magnesium oxide.

The content of yttrium oxide in the zirconia is between 5% and 30% by weight, preferably between 8% and 20% by weight.

The content of magnesium oxide in the zirconia is between 4% and 30% by weight, preferably between 6% and 22% by weight.

The metal tie layer is made of FeCrAl alloy and has a thickness between 100 and 300 μm.

The ceramic layer deposited on the metal tie layer has a thickness between 200 and 400 μm.

According to the invention, the layer of platinum or platinum alloy has a thickness between 200 and 500 μm, preferably between 250 and 350 μm.

According to one embodiment, the side plates and the upper screen optionally present are made of iron alloy and are covered with metal, ceramic and protective coating layers, the bottom plate comprising the nozzles being made of platinum or platinum alloy.

According to another embodiment, the side plates, the upper screen optionally present and the bottom plate are made of iron alloy and are covered with metal, ceramic and protective coating layers, the nozzles being made of platinum or platinum alloy.

The invention also relates to a process for manufacturing a device delivering filaments of molten material, especially glass, wherein the layers forming the diffusion barrier layer are deposited by a technique selected from high velocity oxygen fuel spraying, vacuum plasma spraying or atmospheric plasma spraying.

Advantageously, a heat treatment in air is carried out at a temperature between 900° C. and 1000° C., for a duration of 2 to 5 hours after deposition of the metal tie layer, prior to the deposition of the ceramic layer.

In order to manufacture the device according to the invention, the parts which are not manufactured from iron alloy are welded to the iron-based alloy by arc welding with a non-consumable electrode, laser welding, electron beam welding or diffusion welding.

The invention will now be described in greater detail, with regard to the appended drawings in which:

FIG. 1 schematically illustrates a cross-sectional view of a device delivering filaments of molten material according to the present invention;

According to the invention, at least one portion of the device is made of an iron alloy. In order to withstand high temperatures, it is necessary for this alloy to have a melting point above the operating temperatures of the device, i.e. above 1450° C. The device is heated by Joule heating using an electrical transformer by the connection of two terminals, each located on opposite ends of the device, to external electrical connection components. This type of heating may give rise to the existence of hot spots where the local temperature may be close to 1400° C.

The alloys used as the constituent material of the substrate are iron alloys, and especially FeCrAl alloys. These three elements are the major elements; other elements of the periodic table, such as for example carbon, nickel, silicon, manganese, molybdenum, titanium, tungsten, yttrium, tantalum, zirconium, lanthanum, cerium and hafnium, may also be present in the alloy, as minor constituents.

For example, the iron-based alloy comprises, in percentages by weight, between 20.5% and 23.5% of chromium, 5.8% of aluminum, at most 0.7% of silicon, at most 0.4% of manganese, at most 0.08% of carbon, the remainder being iron.

Mention may be made, for example, of an alloy having the following composition: 22% of chromium, 5.8% of aluminum, at most 0.7% of silicon, at most 0.4% of manganese, at most 0.08% of carbon, the remainder being iron. This alloy is known under the name Kanthal APM®. Its melting point is 1500° C. and it has a good high-temperature dimensional stability.

It may also comprise, in percentages by weight, between 20.5% and 23.5% of chromium, 5% of aluminum, 3% of molybdenum, at most 0.7% of silicon, at most 0.4% of manganese, at most 0.08% of carbon, the remainder being iron.

Very preferably, the composition of the alloy used is the following: 21% of chromium, 5% of aluminum, 3% of molybdenum, at most 0.7% of silicon, at most 0.4% of manganese, at most 0.08% of carbon, the remainder being iron. This alloy is known under the name Kanthal APMT®. Its melting point is 1500° C. and it also has a good high-temperature dimensional stability, its mechanical strength being strengthened by the presence of molybdenum.

Other alloys of Kanthal A-1® or Kanthal AF® type may also be used as the constituent material of the substrate.

Oxide dispersion strengthened alloys, also known as ODS alloys, may be used. For example, mention will be made of:
 the MA 956 alloy comprising 20% of chromium and 4.5% of aluminum, 0.3% of titanium, 0.04% of carbon and 0.5% of yttrium oxide, the remainder being iron,
 the PM 2000 alloy comprising 20% of chromium and around 55% of aluminum, 0.3% of titanium, 0.01% of carbon and of yttrium oxide, the remainder being iron or
 the ODM 751 alloy comprising 16% of chromium and around 4.5% of aluminum, 0.6% of titanium, 0.01% of carbon, 1% of molybdenum and of yttrium oxide, the remainder being iron.

Figure 1:
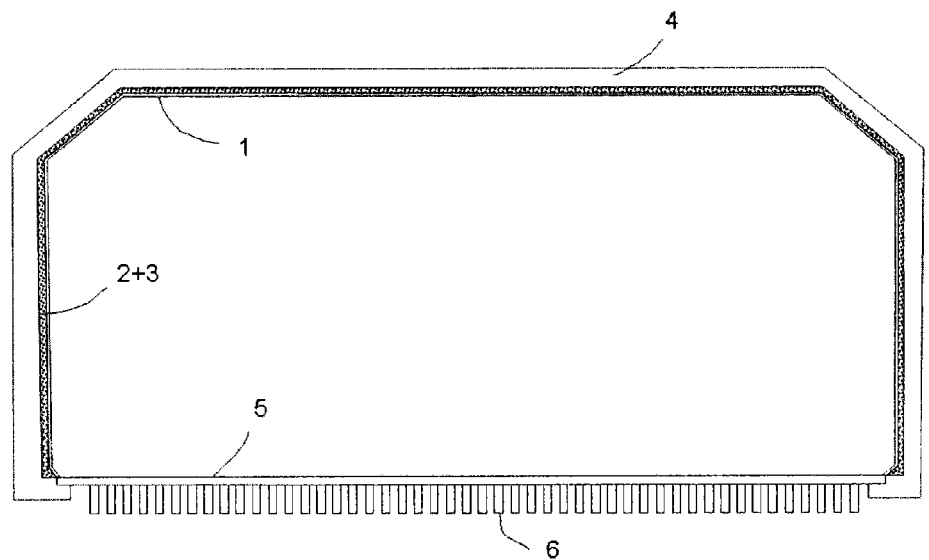
FIG. 1 is a cross-sectional view of the device delivering filaments of molten glass which conventionally comprises a bottom plate 5 provided with a multitude of holes drilled in nozzles 6, enabling the flow and the drawing of the molten material into a multiplicity of filaments, an upper screen and side plates.

In the embodiment represented in FIG. 1, the whole of the body of the device formed by the upper screen and the side plates are made of iron alloy (4) and forms the substrate, the bottom plate comprising the nozzles being made of platinum or platinum alloy.

Certain parts of the device that are not in contact with the molten material may optionally remain in the form of crude substrate, made of iron alloy, without requiring a diffusion barrier layer or a protective coating.

Deposited between the substrate and the protective coating is the diffusion barrier layer. This barrier layer is necessary in order to avoid the formation of a diffusion zone that could be formed at the interface between the substrate and the protective coating. It comprises at least two layers of different nature. The first layer (3) directly deposited on the substrate (4) is a metal layer, known as a metal tie layer. The metal tie layer has a composition substantially identical to that of the substrate. The constituents of this layer are therefore substantially the same as those of the substrate. Thus, the melting points of the metal tie layer and of the substrate are close and their thermal expansion coefficients are of the same order of magnitude. However, due to the deposition techniques used for depositing the metal tie layer that are explained in detail below, their microstructures may be different. The composition of the metal tie layer comprises, in percentages by weight, between 15% and 25% of chromium, between 4.5% and 6.5% of aluminum, optionally between 2% and 4% of molybdenum and optionally at least one element selected from carbon, nickel, silicon, manganese, titanium, tungsten, yttrium, tantalum, zirconium, lanthanum, cerium and hafnium, preferably at contents of at most 1% by weight of each of these elements, the remainder being iron.

By way of example, the metal tie layer has the following composition: 20.5% of chromium, 6.4% of aluminum, 0.75% of silicon, 0.11% of manganese, the remainder being iron.

The metal tie layer is deposited on the substrate by a spraying method. Mention may be made, for example, of high velocity oxygen fuel (HVOF) spraying, vacuum plasma spraying (VPS) or atmospheric plasma spraying (APS).

These techniques make it possible to obtain layer thicknesses of between 100 and 300 µm. Successive depositions may be envisaged if it is desired to obtain greater thicknesses.

It is conceivable to vary the composition of this metal tie layer, while retaining the compatibility with the constituent alloy of the substrate and to produce a stack comprising several successive metal layers of slightly different compositions.

The second layer (2) forming the diffusion barrier layer is a ceramic layer. Preferably, the ceramic used is zirconia $ZrO_2$, stabilized by yttrium oxide $Y_2O_3$ and/or magnesium oxide MgO.

The contents of $Y_2O_3$ or MgO introduced into the zirconia vary respectively between 5% and 30% by weight, preferably 8% and 20% by weight and 4% and 30% by weight, preferably between 6% and 22% by weight.

The ceramic layer has a thickness between 200 and 400 µm. It is deposited by techniques identical to those used for depositing the metal tie layer, namely high velocity oxygen fuel spraying, vacuum plasma spraying or atmospheric plasma spraying.

The metal tie layer makes it possible to ensure a good adhesion of the ceramic layer.

The ceramic used is selected as a function of its thermal expansion coefficient. The stabilized zirconia has the advantage of having relative thermal expansion coefficients that are compatible with the expansion of the metal tie layer. These coefficients are respectively $10 \times 10^{-6}$ $K^{-1}$ and 5 to $10 \times 10^{-6}$ $K^{-1}$ for a zirconia stabilized with magnesium oxide and with yttrium oxide, compared to $11 \times 10^{-6}$ $K^{-1}$ for the metal tie layer described above, the composition of which comprises 20.5% of chromium, 6.4% of aluminum, 0.75% of silicon, 0.11% of manganese, the remainder being iron.

Deposited on the diffusion barrier layer is a protective coating layer made of platinum or platinum alloy. This layer ensures the protection of the device with respect to corrosion caused by contact with the molten glass.

This coating is deposited by thermal spraying. This type of technology is, for example, developed by Johnson Matthey and known under the name ACT® technology, which makes it possible to obtain a coating made of platinum or a platinum-rhodium alloy having a thickness between 200 and 500 µm.

Once covered with the platinum-based protective coating, the ceramic layer has the advantage of remaining inert with respect to the platinum protective coating layer at high temperature. It is possible to easily separate the platinum-based protective coating from the diffusion barrier layer since there are no chemical interactions between these two layers. The thus separated platinum layer can easily be recycled.

The device according to the invention may be manufactured by a series of depositions of layers of different composition.

The surface of the substrate must be cleaned by any surface preparation technique known to a person skilled in the art. Cleaning with alcohol or with acetone then sandblasting with corundum can for example be carried out prior to the deposition, by thermal spraying, of the metal tie coating layer. This cleaning makes it possible to create surface roughness and to improve the adhesion of the sprayed layer.

Once the metal tie layer is deposited, it is possible to carry out a heat treatment in air of the substrate-metal tie layer stack. This treatment is carried out at a temperature between 900° C. and 1000° C., for a duration of 2 to 5 hours and makes it possible to develop a layer of aluminum oxide at the surface of the metal tie layer. This layer of alumina improves the high-temperature oxidation resistance. Thus, the parts of the device in contact with the atmosphere remain stable, unlike what could happen with refractory metals such as molybdenum or tungsten.

The parts of the device which are not manufactured from iron-based alloys may advantageously be welded to the rest of the device.

The welding techniques that can be envisaged are arc welding with a non-consumable electrode (tungsten inert gas or TIG welding), laser welding, electron beam welding or diffusion welding.

It is thus possible, if necessary, to detach these parts and recycle them.

Figure 2:
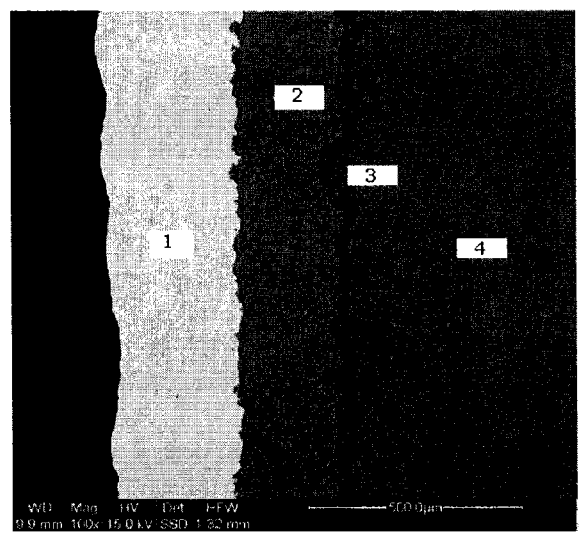
FIG. 2 represents a microscope observation of the protective coating that has been exposed to air at 1300° C. for a duration of 100 hours, in order to simulate the operating conditions of the bushings.

FIG. 2 represents a photo obtained from microscope observation of the substrate (4) coated with the protective layer (1) and diffusion barrier layers. The ceramic layer (2) is a layer of $ZrO_2$-8% $Y_2O_3$. The metal tie layer (3) is slightly oxidized at the surface since a thin layer of alumina has been formed and appears as a dark region in the photo. Since the compositions of the metal tie layer and of the substrate are substantially identical, the distinction between these two layers is difficult to see in FIG. 2.

The invention claimed is:

1. A device suitable for delivering a filament of molten material, the device comprising:
    side plates,
    a bottom plate comprising a nozzle configured for flow of the molten material, and
    optionally an upper screen,
    wherein the side plate, bottom plate, or upper screen is capable of contacting with the molten material and comprises:

a solid part comprising an iron-based alloy substrate having a melting point above 1450° C., a metal tie layer on at least one portion of a surface of the substrate, a ceramic layer covering the metal tie layer, the metal layer and the ceramic layer forming a diffusion barrier to components of the alloy that forms the substrate, and a protective coating layer comprising platinum or platinum alloy, deposited directly on the ceramic layer.

2. The device as claimed in claim 1, wherein the metal, ceramic, and protective coating layers cover all faces of the substrate capable of coming into contact with the molten material.

3. The device as claimed in claim 1, wherein the substrate comprises FeCrAl alloy.

4. The device as claimed in claim 3, wherein the FeCrAl alloy comprises, in percentages by weight, between 15% and 25% of chromium, between 4.5% and 6.5% of aluminum, and optionally at least one further element selected from the group consisting of carbon, nickel, silicon, manganese, titanium, tungsten, yttrium, tantalum, zirconium, lanthanum, cerium, and hafnium, with a remainder of iron.

5. The device as claimed in claim 4, wherein the FeCrAl alloy comprises, in addition, between 2% and 4% by weight of molybdenum.

6. The device of claim 4, wherein a content of each of the at least one further elements if present is at most 1% by weight.

7. The device as claimed in claim 1, wherein the ceramic layer comprises zirconia stabilized with yttrium oxide and/or with magnesium oxide.

8. The device as claimed in claim 7, wherein a content of yttrium oxide in the zirconia is between 5% and 30% by weight.

9. The device of claim 8, wherein the content of yttrium oxide is between 8% and 20% by weight.

10. The device as claimed in claim 7, wherein a content of magnesium oxide in the zirconia is between 4% and 30% by weight.

11. The device of claim 10, wherein the content of magnesium oxide in the zirconia is between 6% and 22% by weight.

12. The device as claimed in claim 1, wherein the metal tie layer is an FeCrAl alloy.

13. The device as claimed in claim 1, wherein the metal tie layer has a thickness between 100 and 300 µm.

14. The device as claimed in claim 1, wherein the ceramic layer has a thickness between 200 and 400 µm.

15. The device as claimed in claim 1, wherein the layer of platinum or platinum alloy has a thickness between 200 and 500 µm.

16. The device as claimed in claim 1, wherein the side plates and the upper screen if present comprise iron alloy and are covered with metal, ceramic and protective coating layers, wherein the bottom plate comprises the nozzles, and wherein the nozzles comprise platinum or platinum alloy.

17. The device as claimed in claim 1, wherein the side plates, the upper screen if present, and the bottom plate comprise iron alloy and are covered with metal, ceramic, and protective coating layers, and wherein the nozzles comprise platinum or platinum alloy.

18. A process for manufacturing the device as claimed in claim 1, the process comprising depositing the metal layer and the ceramic layer on the substrate by a technique selected from the group consisting of high velocity oxygen fuel spraying, vacuum plasma spraying, and atmospheric plasma spraying.

19. The process as claimed in claim 18, further comprising heat treating in air at a temperature between 900° C. and 1000° C., for a duration of from 2 to 5 hours after deposition of the metal tie layer, prior to depositing the ceramic layer.

20. The process of claim 18, further comprising welding parts of the device which are not manufactured from iron alloys to the substrate by arc welding with a non-consumable electrode, laser welding, electron beam welding, or diffusion welding.

* * * * *